United States Patent [19]

Lakin

[11] Patent Number: 4,791,328
[45] Date of Patent: Dec. 13, 1988

[54] MULTI-PIECE ROTOR FOR DYNAMOELECTRIC MACHINE

[75] Inventor: Bryan L. Lakin, Springfield, Mo.

[73] Assignee: Fasco Industries, Inc., Lake Forest, Ill.

[21] Appl. No.: 806,103

[22] Filed: Dec. 6, 1985

[51] Int. Cl.⁴ .......................................... H02K 15/00
[52] U.S. Cl. ...................................... 310/42; 310/156; 310/261
[58] Field of Search ................... 310/42, 44, 216, 217, 310/218, 261, 156, 154, 262, 86, 43

[56] References Cited

U.S. PATENT DOCUMENTS

| | | |
|---|---|---|
| 2,247,890 | 7/1941 | Reardon ............................. 310/426 |
| 2,668,923 | 2/1954 | Bondley . |
| 2,784,333 | 3/1957 | Gunselman . |
| 2,795,715 | 6/1957 | Gilchrist . |
| 2,967,346 | 1/1961 | McMaster et al. . |
| 2,996,791 | 8/1961 | Hicks . |
| 3,013,168 | 12/1961 | Ellis . |
| 3,068,373 | 12/1962 | Bekey ............................. 310/261 X |
| 3,157,806 | 11/1964 | Wiedemann ..................... 310/262 X |
| 3,169,203 | 2/1965 | Lavin .................................. 310/156 |
| 3,469,309 | 9/1969 | Sagalow ........................... 310/42 X |
| 3,639,789 | 2/1972 | Bednarski ....................... 310/261 X |
| 3,717,928 | 2/1973 | Yamaguchi . |
| 3,902,241 | 9/1975 | Wörner et al. . |
| 3,987,539 | 10/1976 | Gravener . |
| 4,060,745 | 11/1977 | Linscott, Jr. ................... 310/261 X |
| 4,095,129 | 6/1978 | Tanai ............................... 310/156 X |
| 4,155,021 | 5/1979 | Corbach et al. ..................... 310/154 |
| 4,182,027 | 1/1980 | Benezech . |
| 4,377,762 | 3/1983 | Tatsumi et al. . |
| 4,494,028 | 1/1985 | Brown . |
| 4,525,957 | 7/1985 | Daniels . |

Primary Examiner—Mark O. Budd
Attorney, Agent, or Firm—Rogers, Howell, Moore & Haferkamp

[57] ABSTRACT

A multi-piece rotor for a dynamoelectric machine includes a core which is bore mounted to a shaft, and one or more annular sleeves which are slip fit and glued onto the shaft, the annular sleeves being characterized by a plurality of longitudinally extending ridges formed along the inner surface thereof, with one or more grooves cut in the inner surface between adjacent ridges such that as the sleeve is assembled to the core, the ridges contact the core and, if tightly fit to the core, the grooves provide adequate space for the insertion of adhesive.

13 Claims, 1 Drawing Sheet

MULTI-PIECE ROTOR FOR DYNAMOELECTRIC MACHINE

BACKGROUND AND SUMMARY OF THE INVENTION

Rotors for dynamoelectric machines, including motors and generators, have been constructed in many different ways in the prior art. One such construction well known in the prior art comprises a sintered iron core mounted to a shaft, the core being generally cylindrical, with one or more annular magnetic sleeves glued to the exterior of the core and surrounded. After being assembled, the core is magnetized in the desired manner to produce a permanent magnet rotor. However, because of the nature of this construction, tight manufacturing tolerances must be imposed and maintained to assure acceptable rotors after the components have been assembled and glued. As can be appreciated, the inner diameter of the annular sleeve must be such that it can be slip fitted over the sintered core and yet provide some space between the sleeve and core for the insertion of glue. However, to achieve true concentricity of the sleeve and shaft, it is desirable to limit the space between the sleeve and core to a minimum. Therefore, if the sleeve is too small for its matching core, it will not slip fit onto the core, or too small a space remains for an adequate amount of glue to be applied to secure the sleeve to the core. Alternatively, if the sleeve is too large, the sloppy fit between the sleeve and core can permit the sleeve to move out of concentricity with the core and shaft which can make the rotor unacceptable for use in a completed device. Of course, it can be very costly to impose and maintain tight manufacturing tolerances, and these extra costs can make a critical difference in small motors or generators which is typically where this type of rotor construction is used. Furthermore, care must be taken in assembling the sleeve to the core and if there is extra equipment or an extra step required in holding the sleeve concentric to the shaft while the glue is applied and cured, this can also increase the cost of manufacture.

To solve these and other problems in manufacturing a small rotor, the inventor herein has succeeded in developing an annular sleeve with a plurality of evenly spaced ridges along the inner surface of the sleeve, the ridges extending longitudinally and substantially parallel to the central axis. Interspaced between these ridges is a plurality of longitudinally extending and axially aligned grooves cut into the inner surface of the sleeve.

By the addition of the ridges along the inner surface of the sleeve, the inventor has succeeded in greatly relaxing the manufacturing tolerance for the sleeve as matched to the core. For example, if the sleeve is perfectly made to match the core, the core will fit snugly against the tops of the ridges, and all of the space between adjacent ridges and the spaces defined by the grooves are available for the application of glue to firmly affix the sleeve to the core. As the ridges are substantially the same height, they hold the sleeve in true concentricity with the core and shaft, as is desired. If the sleeve should be manufactured slightly smaller than optimal for its matching core, then the sleeve is sufficiently flexible or resilient such that the arc of sleeve between adjacent ridges slightly deforms or flattens against the core along its inner surface. This thereby permits assembly of a sleeve which is essentially too tight for its matching core and which would not fit the core if constructed in accordance with the teachings of the prior art. Furthermore, not only does the tight sleeve slip fit onto the core, but it exhibits true concentricity with the shaft and core because the sleeve is constructed of the same material throughout and the deformation between adjacent ridges is substantially the same. By using a large number of ridges, and because of the thickness of the sleeve, the amount of deformation is negligible along the outer surface of the sleeve such that it is not significantly distorted to detract from the operation of the rotor when assembled into a dynamoelectric machine. The ridges need not have a significant height to significantly relax the manufacturing tolerance of the sleeve. Therefore, this deformation effect is minimal when compared with other manufacturing tolerances of the device.

Still another advantage of the ridges is that the sleeve is self-centering as it is slipped onto the core, and it is held in a centered or concentric orientation automatically throughout the gluing and curing process. This completely eliminates the step in the prior art of holding the sleeve in concentric orientation with the core as the glue is applied and cured. For those rotors constructed without this step, the rotor of the present invention exhibits a reliably concentric core throughout the manufacturing run, something which was not easily achieved with the rotors of the prior art design.

The intermediate grooves serve the purpose of providing space along the entire length of the sleeve to receive adhesive even in the case when the sleeve is fully deformed between ridges and tightly pressed against the core. Thus, the grooves ensure that the sleeve is adequately secured to the core regardless of the fit of the sleeve to the core.

The foregoing has been a brief description of the principal advantages and features of the present invention. The invention may be more fully understood and appreciated by referring to the drawings and description of the preferred embodiment which follows.

DETAILED DESCRIPTION OF THE PREFERRED EMBODIMENT

Figure 1:
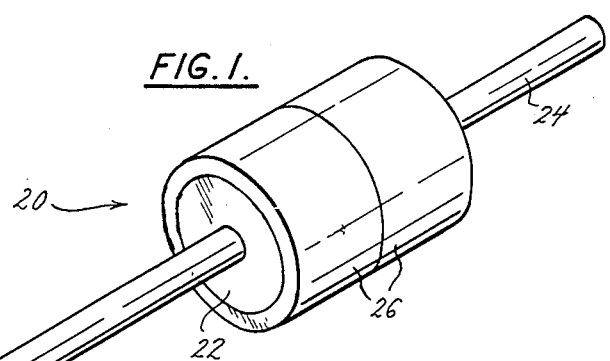
FIG. 1 is a perspective view of a rotor assembled to a shaft.

As shown in FIG. 1, a rotor 20 of the present invention is comprised of a cental core 22 which is bore mounted to a shaft 24, with a pair of annular sleeves 26 concentrically mounted about the core 22. This rotor 20 construction is generally found in smaller dynamoelectric devices such as fractional horsepower motors, the rotor being of a permanent magnet configuration.

Figure 2:
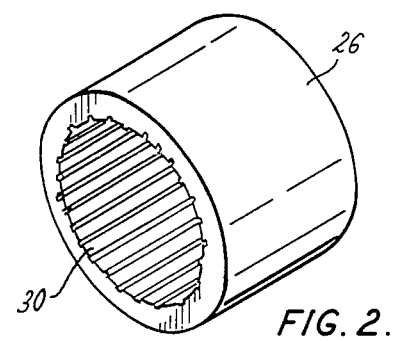
FIG. 2 is a perspective view of the sleeve with ridges and grooves along the inner surface.
Figure 3:
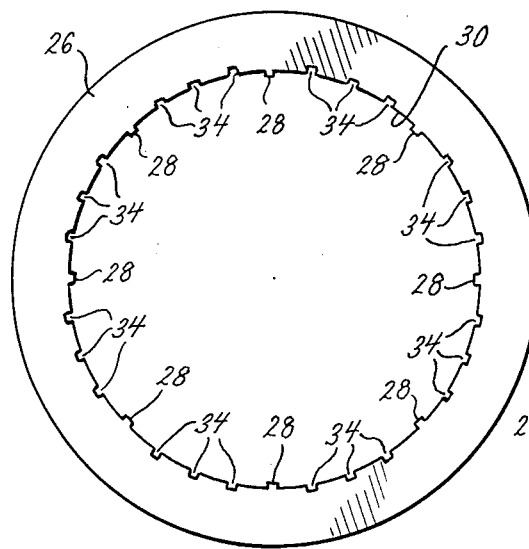
FIG. 3 is an end view of the sleeve of FIG. 2 further detailing the placement of the ridges and grooves along the inner surface thereof.

The annular sleeve 26 of the present invention, as shown in FIGS. 2 and 3, has a plurality of longitudinally extending ridges 28 which are substantially equally spaced along the inner surface 30 of sleeve 26. These ridges 28 are generally rectangular in shape with a flattened portion 32 (as better shown in FIG. 4) for contacting the core 22 and holding the sleeve 26 in a substantially concentric manner about the core 22. The ridges 28 generally have a relatively small height as compared with the thickness of the sleeve 26.

As best shown in FIG. 3, three grooves 34 which are substantially the same dimension as the ridges 28 are cut into the inner surface 30 of the sleeve 26. As best shown in FIG. 2, these grooves 34 are longitudinal and extend the length of sleeve 26 in parallelism with the ridges 28. Although three grooves 34 are shown, it would be apparent to one of ordinary skill in the art that other numbers of grooves 34 could be used, and that the inner surface 30 between some of the adjacent ridges 28 could be entirely free of grooves 34.

Figure 4:
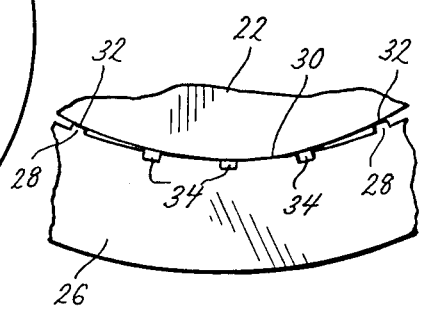
FIG. 4 is a partial view of an annular sleeve assembled to a core and exaggerated to illustrate the deformation of the sleeve against the core.

As best shown in FIG. 4, the sleeve 26, in some instances, might be tighter than optimal, in which event the flattened portion 32 of ridges 28 may ride atop core 22, but the section of sleeve 26 intermediate ridges 28 would slightly deform such that the inner surface 30 could ride up against core 22. In these instances, space is formed between the ridges 28, the adjacent portion of sleeve 26, and the core 22 to receive adhesive. However, to enhance the bonding between the sleeve 26 and core 22 grooves 34 ensure that adequate space is available for the insertion of adhesive to properly bond the annular sleeve 26 to core 22 and hold it during its operational life.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a multi-piece rotor assembly for a dynamoelectric machine, said rotor comprising a core mounted to a shaft, said core having a substantial smooth outer surface and an annular magnetic sleeve glued to the core, the improvement comprising means formed along the inner surface of the sleeve to position and hold the sleeve in a concentric orientation to the core prior to application of the glue, said positioning means having means to position and hold a sleeve having any inside diameter within a range of inside diameters, and said positioning means leaving spaces between the annular sleeve and the core to contain the glue which affixes said annular sleeve to the core in permanent fashion.

2. The device of claim 1 wherein the positioning means comprises a plurality of longitudinal ridges spaced about the sleeve inner surface, the ridges extending radially inward from the inner surface of the sleeve.

3. The device of claim 2 wherein the sleeve is sufficiently flexible to flatten between ridges when placed under tension so that a sleeve of slightly smaller than matching diameter may be fit onto the core and held in a concentric orientation.

4. The device of claim 3 wherein the ridges are all of substantially the same height, and the ridges are spaced equally about the sleeve inner surface.

5. The device of claim 1 further comprising means defining at least one space formed into the inner surface of the sleeve to contain glue.

6. The device of claim 5 wherein said sleeve inner surface space comprises a plurality of longitudinally extending grooves.

7. The device of claim 6 wherein the positioning means comprises a plurality of longitudinally extending ridges spaced about the sleeve inner surface, the grooves being located between the ridges.

8. The device of claim 7 wherein the ridges are equally spaced, and wherein three grooves are equally spaced between each pair of ridges.

9. The device of claim 1 wherein the annular sleeve is rotationally insensitive to mounting on the core.

10. In a multi-piece rotor assembly for a dynamoelectric machine, said rotor comprising a core mounted to a shaft and an annular magnetic sleeve glued to the core, the core having a substantially smooth outer surface, the improvement comprising a plurality of spaced longitudinal ridges extending radially inwardly from the inner surface of the sleeve, said ridges all being substantially straight and parallel to the axis of the rotor, said ridges being substantially equally spaced about the inner surface and of substantially the same height, said sleeve being sufficiently flexible to flatten between ridges when placed under tension so that a sleeve of slightly smaller than matching diameter may be fit onto the core and held in a concentric orientation to the core prior to application of the glue.

11. The device of claim 10 further comprising a plurality of longitudinally extending grooves formed into the inner surface of the sleeve, said grooves being adapted to receive glue to permanently affix the sleeve to the core.

12. The device of claim 11 wherein three grooves are substantially equally spaced between each pair of ridges.

13. An annular magnetic sleeve for mounting to a core to complete a rotor assembly for a dynamoelectric machine, said core having a substantially smooth outer surface, said annular magnetic sleeve having a plurality of spaced ridges along the inner surface thereof, the ridges being substantially straight and parallel to the central axis of the sleeve, substantially equally spaced about the inner surface and of substantially the same height, and a plurality of longitudinally extending grooves spaced along the inner surface of the sleeve, said grooves being adapted to receive glue after the sleeve is installed on the core to permanently affix it in place, and wherein the sleeve is sufficiently flexible to flatten between ridges when placed under tension so that a sleeve of slightly smaller than matching diameter may be fit onto a core and held in a concentric orientation.

* * * * *